United States Patent

Rambow et al.

[11] Patent Number: 4,992,994
[45] Date of Patent: Feb. 12, 1991

[54] BOREHOLE TELEVIEWER FOR FRACTURE DETECTION AND CEMENT EVALUATION

[75] Inventors: Frederick H. K. Rambow, Houston; Edward A. Clerke, Missouri City, both of Tex.

[73] Assignee: Shell Oil Company, Houston, Tex.

[21] Appl. No.: 330,384

[22] Filed: Mar. 29, 1989

[51] Int. Cl.$^5$ .............................................. G01V 1/40
[52] U.S. Cl. ...................................... 367/25; 181/102; 181/104; 181/105; 367/35
[58] Field of Search ......................... 367/27, 35, 69, 86, 367/25, 159; 181/104, 105, 102; 73/151

[56] References Cited

U.S. PATENT DOCUMENTS

| | | | |
|---|---|---|---|
| 4,601,024 | 7/1986 | Broding | 367/86 |
| 4,646,565 | 3/1987 | Siegfried | 181/105 |
| 4,665,511 | 5/1987 | Rodney et al. | 367/35 |
| 4,802,145 | 1/1989 | Mount, II | 367/35 |
| 4,803,667 | 2/1989 | Siegfried, II | 367/69 |
| 4,809,237 | 2/1989 | Vogel et al. | 181/105 |
| 4,867,264 | 9/1989 | Siegfried | 367/35 |

Primary Examiner—Ian J. Lobo

[57] ABSTRACT

An acoustic logging system for detecting anomalies in formations surrounding a borehole. The system can be used for evaluating the formation for fractures or the bond between a well casing and the cement used to seal the space between the casing and the formation. The system utilizes at least one rotating acoustical transmitter/receiver and at least one receiver vertically spaced from the rotating transducer. The signals from both receivers are analyzed to detect the presence of anomalies, such as fractures or voids in a cement bond.

4 Claims, 1 Drawing Sheet

BOREHOLE TELEVIEWER FOR FRACTURE DETECTION AND CEMENT EVALUATION

BACKGROUND OF THE INVENTION

The present invention relates to acoustic logging systems and more particularly to acoustic logging systems that are referred to as borehole televiewers. A borehole televiewer refers to an acoustic logging system in which a transducer transmits a beam of high frequency acoustic energy into the borehole in a radial plane and receives the reflected response of the acoustic pulse. The transducer is mounted in a housing so that it may be rotated to scan the complete surface of the borehole. Such systems are also used to scan casing which is used for lining a borehole to determine the condition of the casing.

These systems have been extensively used for scanning the surface of a borehole to determine the lithology of the formations penetrated by the borehole as well as locating bedding planes and similar characteristics of the formations. The system has also been used to determine the quality of the bond between cement and the well casing. This type of system has been described in the prior art and particularly in U.S. Pat. No. 3,369,626 entitled "Method and Apparatus for Producing A Visual Record of Physical Conditions of Materials Transversed by a Borehole".

While the systems have been described in the prior art and have been extensively used, they do have several shortcomings. Since only a single transducer is used to transmit the acoustic pulse into the formation and receive the reflected response of the acoustic pulse, the system does not respond to anomalies which do not lie in a plane that is substantially perpendicular to the direction of the pulse. Fractures in almost all cases lie at some angle to the borehole. Likewise, there may be anomalies or channels in the cement between the formation and the well casing that will allow unwanted flow of fluids behind the well casing.

The aforementioned shortcomings produce ambiguities when the system is used to evaluate fractured formations penetrated by a borehole. While the prior art system locates fractures that penetrate the borehole, it does not evaluate the fracture. In particular, it does not indicate whether the fracture is open or closed. Obviously, if the fracture is closed it will be impossible to produce the formation even though hydrocarbons may be present in the fractures. Thus, accurate evaluation of fractures is important.

U.S. Pat. No. 4,601,024 described a borehole televiewer using multiple vertically spaced transmitting-/receiving transducers to improve the performance of the system. The patent describes the tilting of the acoustic beam of the transducers to obtain deeper penetration of the acoustic beam into the formation. The patent does not address the problem of obtaining a response from a feature that is not coplanar with the borehole.

SUMMARY OF THE INVENTION

The present invention solves the above shortcomings of the prior art systems by providing additional receivers on the logging tool. In particular, omnidirectional receivers are provided on the tool with the receivers being spaced vertically to one side of the transducer which produces the acoustic pluses.

Placing the additional receivers to one side of the transducer ensures the reception of energy which is reflected from a surface that does not lie in a plane substantially perpendicular to the direction of the acoustic pulse. Fractures are normally positioned at an angle to the borehole axis and reflect the acoustic pulse at an angle to the axis of the acoustic pulse. Similarly, voids in a cement bond that normally have an irregular shape reflect the acoustic pulse at an angle other than directly back along the axis of which it was transmitted. In both of these cases the reflected acoustic pulse will be detected by one of the vertically spaced receivers.

The use of omnidirectional receivers eliminates the need to rotate the additional receivers in synchronism with the transducer. This greatly simplifies the construction and maintenance of the tool.

In the case of fractures, an open fracture will reflect the acoustic pulse while a closed fracture will not. It has been determined that in average borehole conditions, fractures open only 0.001 inches will reflect a detectable acoustic pulse. The fracture must dip at an angle of 45 degrees or more with respect to the horizontal in order to reflect the acoustic pulse back into the borehole. At less than 45 degrees the pulse will be reflected into the formation.

The reflected responses that are received by both the transducer and the additional receivers are converted to related electrical signals by the transducer and receivers respectively. The electrical signals are transmitted to the surface and recorded while preserving both the time relationship between the production of the acoustic pulse and the receiving of the response of the acoustic pulse and the amplitude of the reflection. By recording the signals while preserving the time relationship one can readily analyze the record to determine the location of voids or similar anomalies in a cement bond or the presence of fractures in formations surrounding the borehole. While visual interpretation of the recording is normally preferred, obviously various machine-type interpretations could also be used. Also, the recording systems described in the prior art that display the amplitude of the signal on a cathode ray tube and then photograph the display could be used.

BRIEF DESCRIPTION OF THE DRAWINGS

The preferred embodiment of the present invention will be described in relation to the attached drawings in which.

DESCRIPTION OF THE PREFERRED EMBODIMENT

Figure 1:
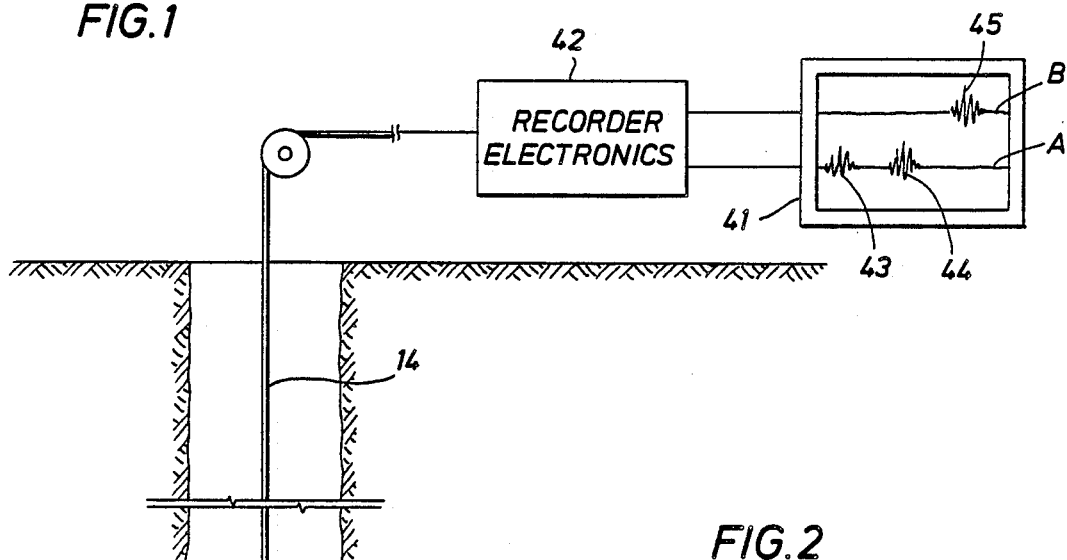
FIG. 1 is an elevation view of a borehole televiewer having additional receivers disposed in a cased borehole.

Referring now to FIG. 1 there is shown a borehole televiewer logging tool 10 disposed in a borehole by means of a cable 14. The cable 14 contains the necessary conductors for transmitting power to the tool and transmitting signals from the tool to the surface recording equipment not shown in FIG. 1. In addition, of course, the cable is used for raising and lowering the tool in the borehole. The borehole televiewer 10 is similar to that described in the above referred patent and other publications. It includes a transceiver/transducer 20 which is mounted in a rotating section of the tool that is designed to rotate the transceiver in a plane substantially perpendicular to the axis of the tool. The tool includes sufficient circuitry to periodically pulse the transceiver at a frequency of at least 250 kHz to produce a very narrow beam acoustic pulse. The transceiver emits an acoustic pulse and the circuit switches the transceiver to a receive mode so that the reflected response of the acoustic pulse can be received. Suitable signals are sent to the surface for recording to produce the desired records. These normally include both the time relationship between the initiation of the acoustic pulse and receiving of the response and the amplitude of the pulse and reflected response. Also, suitable signals are sent to the surface for orienting the tool in the borehole in relation to geographic north.

The tool is shown disposed within the borehole 11 opposite a fracture 13 that intersects the borehole at 15. While the fracture is shown as intersecting the borehole, it could be contained entirely within the formation. In either situation acoustic energy will be reflected from the fracture and the reflected energy detected by one of the receivers 21-23.

Also shown in FIG. 1 is a block diagram of the circuits for recording the received reflections on a chart recorder 41. In particular, the pulse used for energizing the transceiver to produce the acoustic pulse also transmits a signal to the recorder 41 to trigger the start of a recording. The downhole signals are received by the recorder electronics 42 that separates the various receiver signals so that they can be used to produce separate traces on the recorder. In particular, the recorder 41 may be a conventional oscilloscope with the signal being used to trigger the start of the sweep A. As shown, the sweep A will contain a signal 43 which is the acoustic pulse and signal 44 that is the reflection of the acoustic pulse from the wall of the borehole. A second trace B is shown on the recorder 41 which is the signal from the receiver 21. The trace B will not have any reflections from the wall of the borehole but will show a signal 45 which is the reflected response from the point 32 of the fracture. By displaying both the signals from the transceiver and the receiver, one can easily determine that a fracture is present in the cement surrounding the borehole.

An alternative to the above recording system would be the use of the systems described in prior art borehole televiewer patents. For example, the system described in U.S. Pat. No. 4,463,378 could be adapted for use in the present invention. Using prior art systems one would obtain a record that would indicate the presence of fractures in the formation. The present invention would determine if the fractures are open or closed. The combination of this information will allow an accurate evaluation of the formation.

The logging tool is provided with three additional receivers 21, 22 and 23. These receivers are omnidirectional receivers and are passive in that they merely receive the reflected response of the acoustic pulse and do not generate acoustic pules. Suitable receivers could be formed of thin film material which is fixed to the exterior of the tool and protected by a coating, for example an epoxy coating. Various type thin film piezoelectric materials may be used for forming the receivers, for example Kynar Piezo Film, manufactured by the Pennwalt Corporations, King of Prussia, Pa. 19406-0018. The receivers are coupled to the cable 14 and suitable circuitry is provided for transmitting the signals from the receivers while preserving both the amplitude of the signals and the time relationship between the receiver signals and the production of the acoustic pulse. In addition to preserving the character of the signals, suitable circuits should be provided to allow the separate transmission of the signals from transducer 20 and receivers 21-23. This is necessary since the commonly used logging cable contains only six conductors. A person skilled in the art can adapt known multiplexing circuits for use in the logging tool. An alternative arrangement of using multiple pulses of the transducer 20 and transmitting signals from a single selected receiver for each pulse could also be used.

Figure 2:
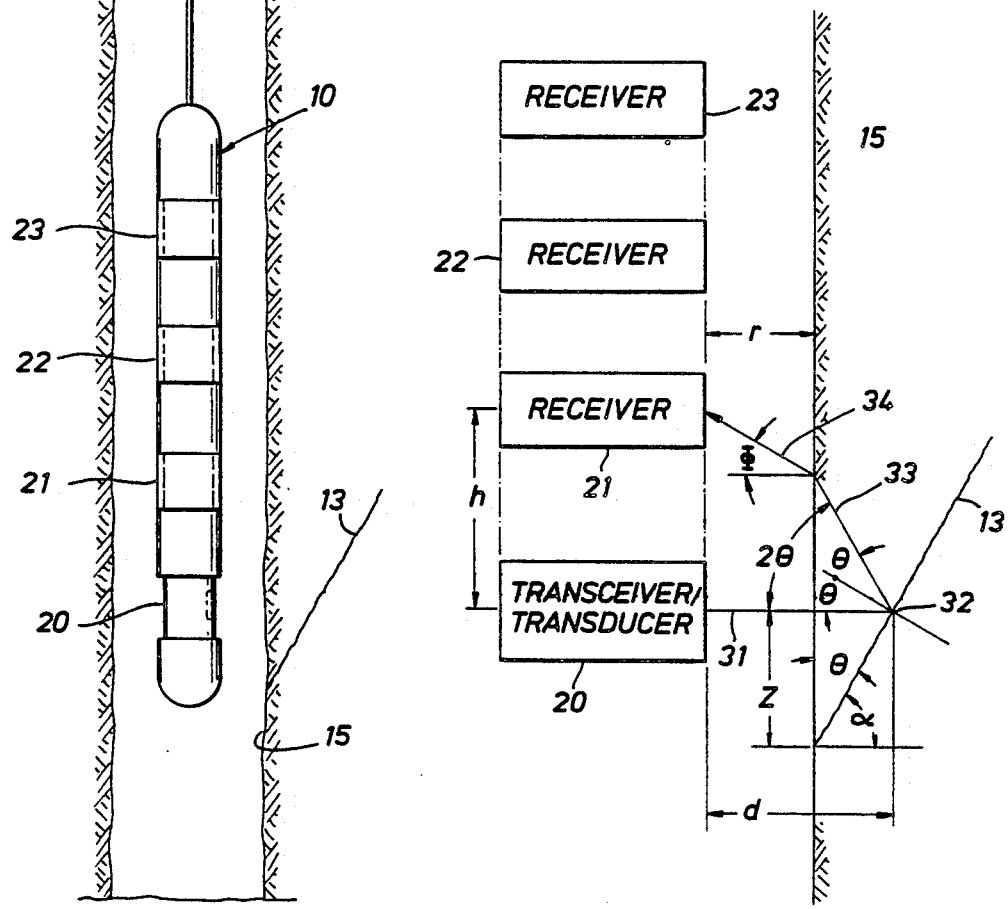
FIG. 2 is an enlarged view of a portion of the system shown in FIG. 1.

Referring now to FIG. 2 there is shown the tool of FIG. 1 disposed opposite the fracture 13. As shown, the transceiver 20 transmits a pulse outwardly through the borehole into the formation surrounding the borehole where it is reflected at a point 32 on the fracture 13. The acoustic pulse is reflected from the surface along a line 33 which passes through the borehole wall where the line is again refracted to a ray 34 which then strikes the receiver 21. As shown, the angle between the acoustic pulse path 31 and the reflection line 33 is $2\theta$ while the refraction caused by the interface between the formation and borehole fluid is $\Phi$.

From FIG. 2 one can obtain the following expressions:

The vertical offset h between the transducer 20 and receiver 21 to which the reflected signal 34 returns is $$h = (d-r)\tan 2\theta + r \tan \phi \quad (1)$$

The total travel time is $$T = \frac{r}{V_m} + \frac{d-r}{V_R} + \frac{d-r}{V_R \cos(2\theta)} + \frac{r}{V_m \cos\phi} \quad (2)$$

The difference in travel time between arrival of first reflection 44 off the borehole wall and arrival of the reflection from the fracture is $$\Delta T = \frac{d-r}{V_R} + \frac{d-r}{V_R \cos(2\theta)} + \frac{r}{V_m \cos\phi} - \frac{r}{V_m} \quad (3)$$

The height above the fracture-borehole intersection where the beam 31 intercepts the borehole is $$Z = \frac{d-r}{\tan\theta}$$

and hence $\Delta T$ as a function of Z is:

$$\Delta T(Z) = \frac{Z\tan\theta}{V_R} + \frac{Z\tan\theta}{V_R \cos(2\theta)} + \frac{r}{V_m \cos\theta} - \frac{r}{V_m} \quad (4)$$

In the above expressions $$\theta = \pi/2 - \alpha$$

$$\Phi = \arcsin\left(\frac{V_m}{V_R} \sin 2\theta\right)$$

where $V_m$ and $V_R$ are the velocity of sound in the borehole fluid and formation, respectively.

From the above, one can calculate the position of the fracture in the formation using date obtained over an interval in the borehole. The extent of the fracture can also be determined unless it extends beyond the depth of penetration of the acoustic pulse in the formation.

While the above description relates to the detection of a fracture, any anomaly present in the formation will be detected. Also, voids in cement used for cementing casing in a borehole can be detected.

What is claimed is:

1. A method for acoustically logging a borehole in the earth to detect anomalies in the earth formation beyond the wall of said borehole, said method comprising:
   (a) generating a plurality of narrow beam acoustic pulses with a rotating transducer at a first location in the borehole, wherein the complete circumference of the borehole at said first location is scanned by said pulses;
   (b) receiving at said first location the reflected responses of said acoustic pulses and producing a first electrical signal;
   (c) receiving at a second location vertically spaced from said first location the reflected responses of said acoustic pulses with a single element annular thin film omnidirectional receiver and producing a second electrical signal;
   (d) recording said first and second electrical signals to provide a visual display of the elapsed time between the generating of said acoustic pulses and the occurrence of reflection events from said anomalies in said first and second electrical signals; and
   (e) analyzing said display to locate the position of said anomalies.

2. An apparatus for acoustically logging a borehole, comprising:
   a transceiving transducer, said transducer being disposed to rotate in a plane substantially at right angles to the axis of the borehole, said transducer producing a plurality of acoustic pulses, receiving the reflected response of the acoustic pulses, and producing a first electrical signal related to the reflected response;
   at least one additional omnidirectional receiver, said receiver comprising a single element annular thin film omnidirectional transducer, said receiver being spaced vertically along the axis of the borehole from the location of said transducer to receive the reflected response of said acoustic pulses and producing a second electrical signal related to the reflected response; and
   recording said first and second electrical signals while preserving the time relationship between the production of the acoustic pulses and the receiving of the reflected response.

3. The apparatus of claim 2 wherein said omnidirectional receiver comprises a thin film of piezoelectric material.

4. The apparatus of claim 2 wherein said transceiver is operated at a frequency of at least 250 kHz.

* * * * *